US011002628B2

(12) United States Patent
Bergquist

(10) Patent No.: US 11,002,628 B2
(45) Date of Patent: May 11, 2021

(54) THERMOWELL WITH PRIMARY SEAL VERIFICATION

(71) Applicant: Rosemount Inc., Shakopee, MN (US)

(72) Inventor: Donald Gary Bergquist, Burnsville, MN (US)

(73) Assignee: ROSEMOUNT INC., Shakopee, MN (US)

( * ) Notice: Subject to any disclaimer, the term of this patent is extended or adjusted under 35 U.S.C. 154(b) by 138 days.

(21) Appl. No.: 16/136,716

(22) Filed: Sep. 20, 2018

(65) Prior Publication Data

US 2020/0096409 A1 Mar. 26, 2020

(51) Int. Cl.
| G01K 1/00 | (2006.01) |
| G01K 13/00 | (2021.01) |
| G01M 3/14 | (2006.01) |
| G01K 1/08 | (2021.01) |
| G01K 1/14 | (2021.01) |
| G01K 13/02 | (2021.01) |

(52) U.S. Cl.
CPC ............. *G01M 3/143* (2013.01); *G01K 1/08* (2013.01); *G01K 1/14* (2013.01); *G01K 13/02* (2013.01)

(58) Field of Classification Search
None
See application file for complete search history.

(56) References Cited

U.S. PATENT DOCUMENTS

| 7,637,170 B2 | 12/2009 | Foster et al. |
| 10,620,056 B2 | 4/2020 | Thies et al. |
| 2017/0003229 A1 | 1/2017 | Yunker et al. |
| 2017/0131150 A1 | 5/2017 | Thies et al. |

FOREIGN PATENT DOCUMENTS

| CN | 106679834 | 5/2017 |
| CN | 207019802 | 2/2018 |
| CN | 207114049 | 3/2018 |
| KR | 10-1794118 | 11/2017 |
| WO | WO 94/02772 | 2/1994 |

OTHER PUBLICATIONS

Notification of Transmittal of the International Search Report and the Written Opinion of the International Searching Authority from International Application No. PCT/US2019/037455, dated Sep. 26, 2019.
Office Action from Chinese Patent Application No. 201811423425. 8, dated Dec. 2, 2020.

*Primary Examiner* — Mirellys Jagan
(74) *Attorney, Agent, or Firm* — Westman, Champlin & Koehler, P.A.

(57) ABSTRACT

A thermowell assembly for use in measuring a temperature of a process fluid includes an elongate thermowell body configured to mount to a process vessel and extend into the process fluid. An elongate bore extends along a length of the thermowell body from a proximal end of the thermowell body proximate a wall of the process vessel to a sealed distal end of the thermowell body positioned in the process fluid. A side bore extends from an exterior of the thermowell assembly to the elongate bore. The side bore is positioned outside of the process vessel. A verification valve includes an inlet coupled to the side bore at the exterior of the thermowell assembly and further includes an outlet.

14 Claims, 5 Drawing Sheets

THERMOWELL WITH PRIMARY SEAL VERIFICATION

BACKGROUND

The present invention relates to a system which measures a process variable and an industrial process. More specifically, the present invention relates to a measuring process temperature using a thermowell which extends into a process fluid.

Industrial processes are used in the production and manufacture of goods such as oil, chemical, paper, etc. In such industrial processes, it is often desirable to measure a process variable, such as a temperature of a process fluid, and use that information to control or otherwise monitor the industrial process. One technique used to measure a process temperature is through the use of a process variable transmitter which includes a temperature sensor. The temperature sensor is thermally coupled to a temperature to be measured using what is known as a "thermowell" which extends into a process fluid. The process variable transmitter measures the process temperature using a temperature sensor and reports that information back to another location such as a control room.

The thermowell is typically formed by an elongate thermowell body having a bore extending therethrough. For purposes of maintenance or diagnostics, an operator may need to remove the process variable transmitter from the thermowell. It is possible that over the lifetime of the thermowell, a wall of the thermowell may fail and the bore of the thermowell fills with the process fluid. If the process fluid is under pressure, removing the process variable transmitter can be difficult and result in the loss of process fluid through the opening in the thermowell and into the environment.

SUMMARY

A thermowell assembly is provided for use in measuring a temperature of a process fluid. The thermowell assembly includes an elongate thermowell body which is configured to mount to a process vessel and extend into the process fluid contained in the process vessel. An elongate bore extends along a length of the elongate thermowell body from a proximal end of the elongate thermowell body proximate a wall of the process vessel to a sealed distal end of the elongate thermowell body positioned in the process fluid. A side bore extends from an exterior of the thermowell assembly to the elongate bore. The side bore is positioned outside of the process vessel. A verification valve includes an inlet coupled to the side bore at the exterior of the thermowell assembly and further includes an outlet. The verification valve allows an operator to verify a presence of process fluid in the elongate bore by opening the verification valve and observing process fluid at the outlet of the verification valve.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

A thermowell assembly is provided which allows verification that the primary seal of the thermowell is intact. This allows an operator to verify that the primary seal is intact prior to accessing a sealed sensing element located in or adjacent a proximal end of the thermowell. If the sealed sensing element is accessed without verification that the primary seal is intact, an uncontrolled release of process fluid may occur if the thermowell primary seal has been compromised.

Figure 1:
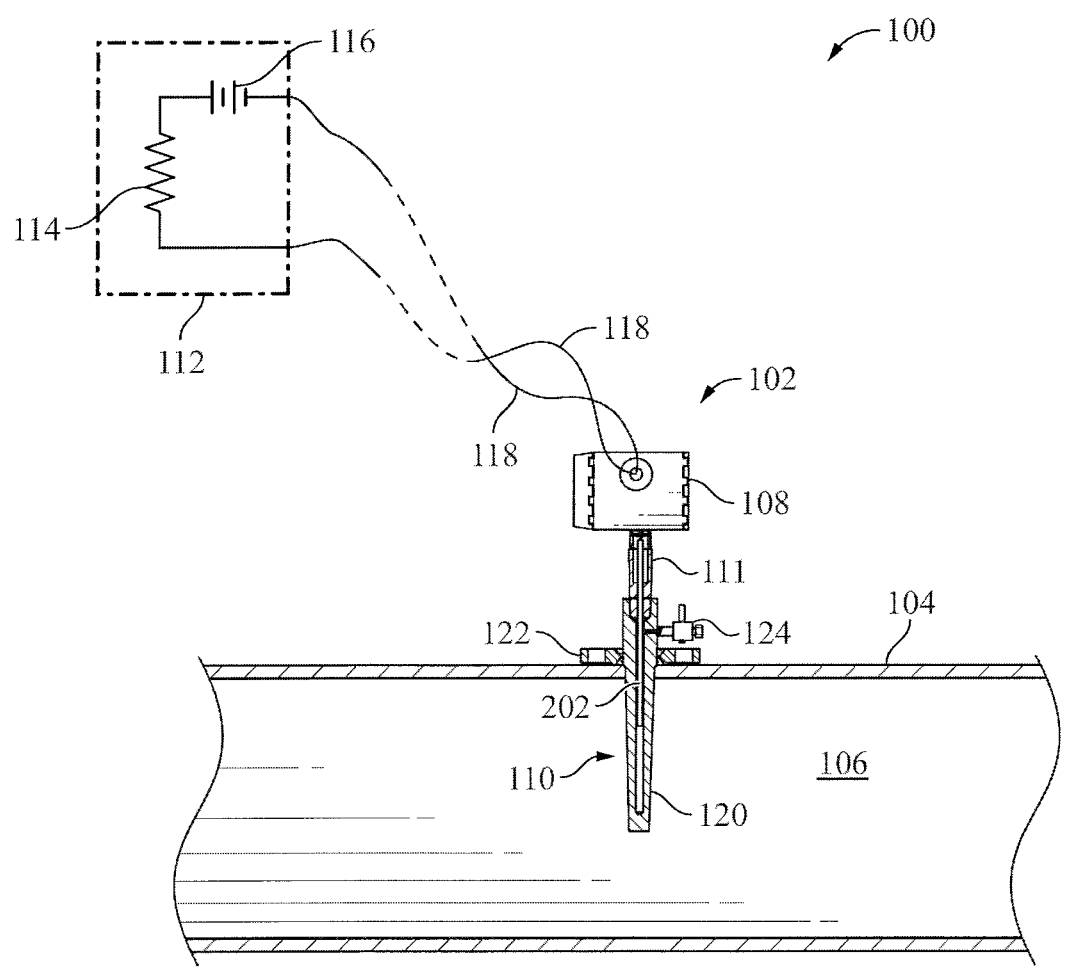
FIG. 1 is a simplified diagram showing an industrial process having a process variable transmitter coupled to a thermowell for use in measuring a temperature of a process fluid.

FIG. 1 is a simplified block diagram showing an industrial process control or monitoring system 100 including a process variable (temperature) transmitter 102. Transmitter 102 is mounted to the processing piping 104 which contains a process fluid 106 therein. Process piping 104 is one example of a process vessel. Another example is a container or tank which contains a process fluid.

The temperature transmitter 102 includes a housing 108 coupled to a thermowell assembly 110 through a sensor adapter or assembly 111. The temperature transmitter 102 includes a temperature sensor 202 carried by the sensor adapter 111 thermally coupled to the thermowell assembly 110. Electronics within the housing 108 is coupled to the temperature sensor 202 and used to measure a temperature of the process fluid 106. Information related to this temperature is conveyed to a remote location 112, such as a process control room which is modeled as a resistance 114 and a voltage source 116. The communication may be through, for example, a two wire process control loop 118 in which the same two wires can be used to power the temperature transmitter 102 as well as convey information. One example of a two wire process control loop is one which operates in accordance with the HART® communication standard in which a current is carried on the process control loop 118. The analog value of the current can be modulated by the transmitter 102 to represent a process variable such as the measured variable. Additionally, digital information can be modulated on top of the analog current level to convey additional information, either to or from the process variable transmitter 102. Other types of process control loops 118 may also be used including wireless process control loops such as those which are in accordance with WirelessHART® (IEC 62591).

In FIG. 1 thermowell assembly 110 is illustrated as including an elongate thermowell body 120 which is mounted to the process vessel 104 using a mounting plate 122. As will be described below in more detail, a verification valve 124 is provided for verifying that the primary seal provided by the elongate thermowell body 120 is intact.

Figure 2A:
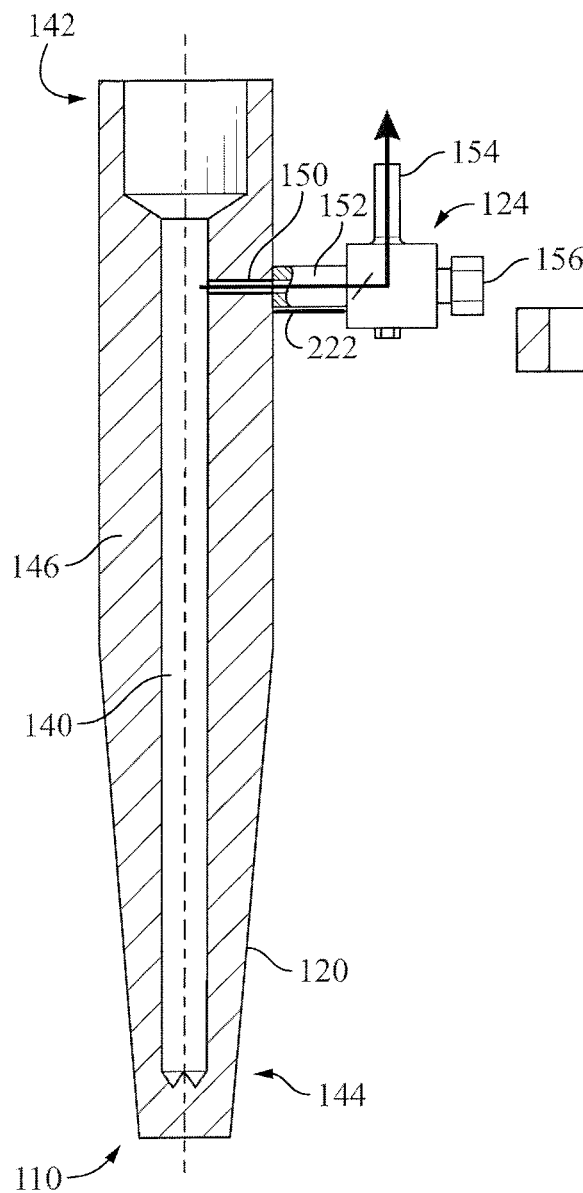
FIG. 2A is a side cross-sectional view of one example configuration of a thermowell assembly including a verification valve.
Figure 2B:
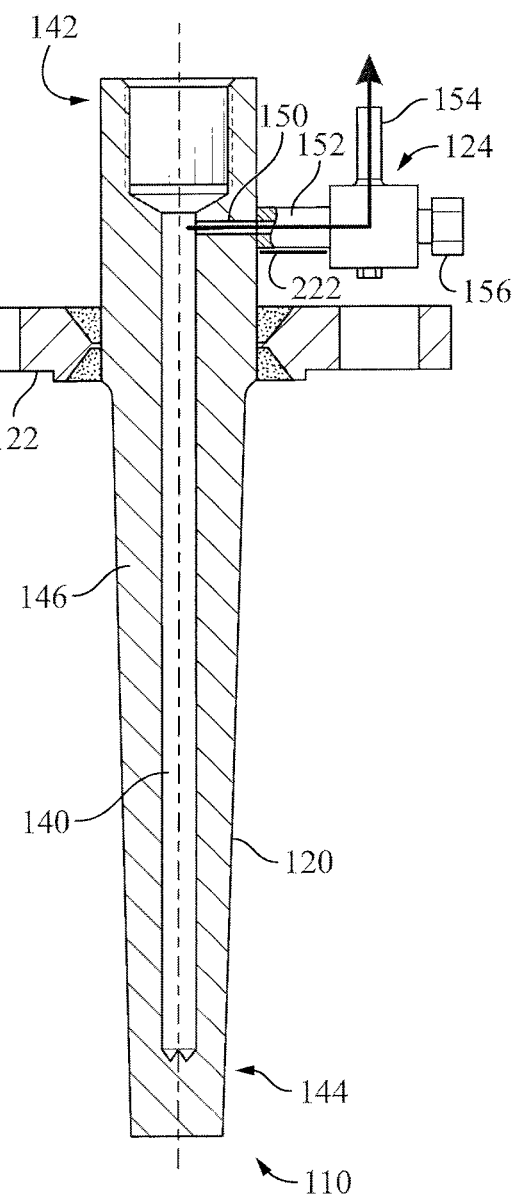
FIG. 2B is a side cross-section view of another example configuration of a thermowell assembly including a verification valve.
Figures 2C, 3A:
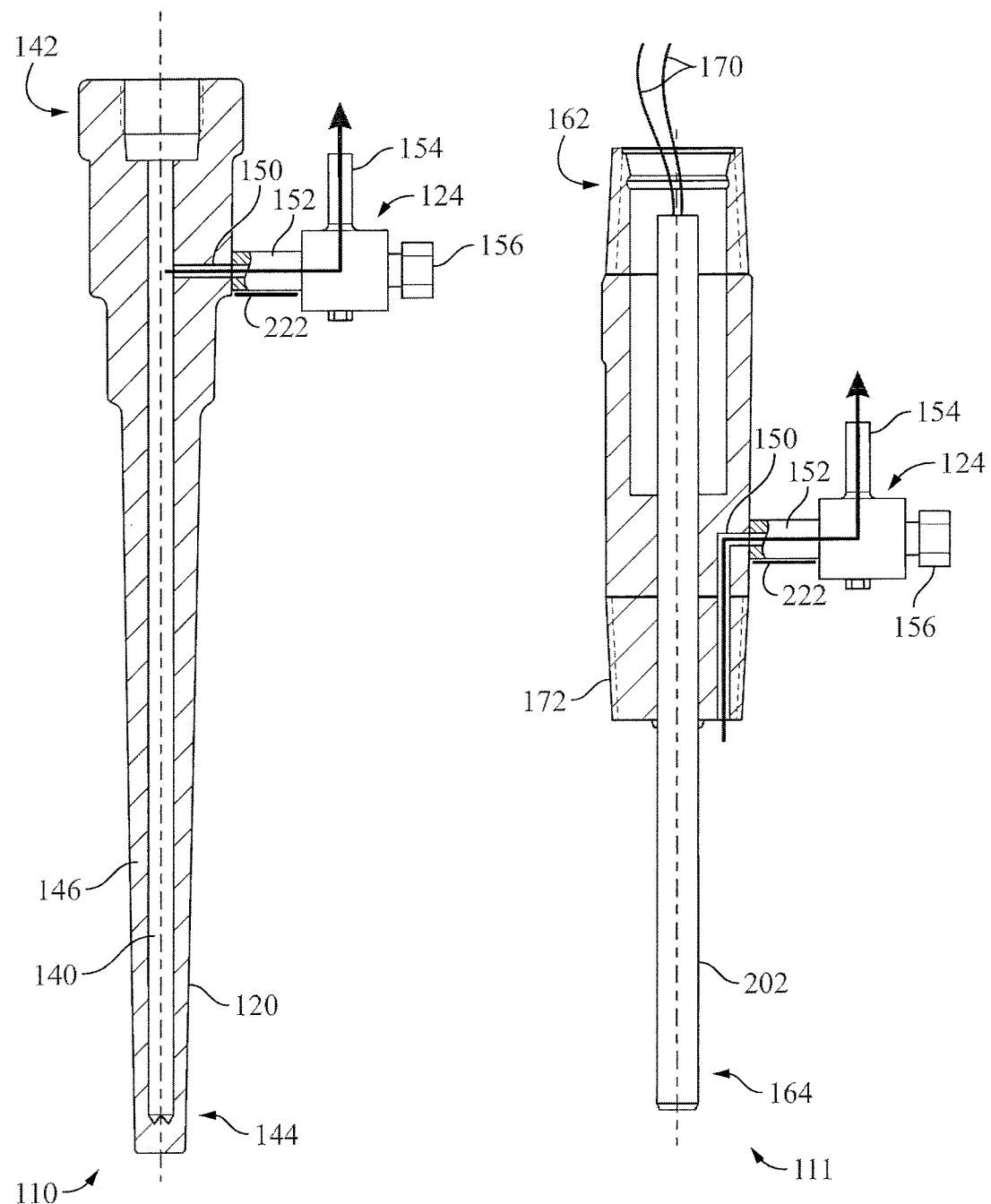
FIG. 2C is a side cross-section view of another example configuration of a thermowell assembly including a verification valve.
FIG. 3A is a side cross-sectional view of a sensor assembly including a verification valve in accordance with another example configuration.

FIGS. 2A, 2B and 2C are side cross-sectional views showing example embodiments of thermowell assemblies 110, however, the present invention is not limited to these specific configurations. In FIGS. 2A, 2B and 2C, the thermowell assembly 110 includes an elongate bore 140 which extends into the elongate thermowell body 120 from a proximal end 142 of the elongate thermowell body 120 to a sealed distal end 144. A wall 146 of the elongate thermowell body 120 provides a primary seal to prevent process fluid from entering the elongate bore 140. The sensor assembly 111 provides the secondary seal to prevent fluid from entering the environment if there is loss of the primary thermowell containment.

As illustrated in FIGS. 2A-2C, a side bore 150 extends from an exterior of the elongate thermowell body to the elongate bore 140. This side bore 150 is positioned along a length of the elongate thermowell body 120 such that it is located outside of any process vessel to which the elongate thermowell body is mounted. The verification valve 124 is sealably coupled to the side bore 150 and includes an inlet 152 coupled to the side bore 150. The verification valve 124 further includes an outlet 154. A valve stem 156 is provided such that the valve stem 156 may be rotated by an operator to open or close a connection between the inlet 152 and the outlet 154. Note that in the configuration of FIG. 2B, the thermowell assembly 110 includes mounting plate 122 as illustrated in FIG. 1.

Figure 3B:
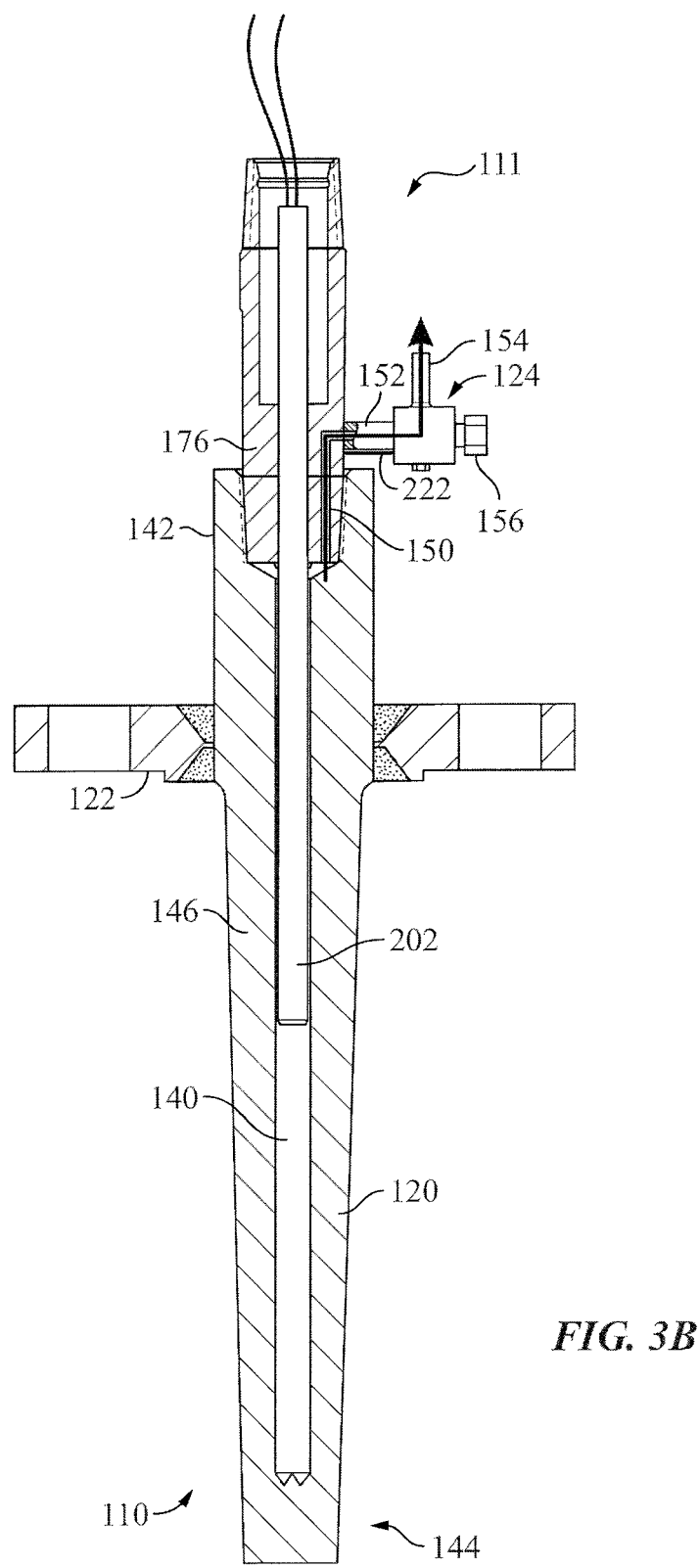
FIG. 3B is a side cross-sectional view of the sensor assembly of FIG. 3A assembled with a thermowell.

FIG. 3A is a side cross-sectional view of a sensor adapter 111 in accordance with another example embodiment. FIG. 3B is a side cross-sectional view of a sensor adapter 111 assembled with a thermowell body 120. As illustrated in FIGS. 3A and 3B, the temperature sensor 202 includes electrical wiring 170 which couples to transmitter electronics to provide a signal related to sensed temperature to the electronics. Sensor adapter 111 includes the threaded portion 172 which is threadably received in a threaded portion of thermowell body 120. The temperature sensor 202 extends into the elongate bore 140 of the thermowell body 120. In this configuration the side bore 150 couples to elongate bore 140 through a body 176 of the sensor assembly 111. The configuration illustrated in FIGS. 3A and 3B allows a conventional thermowell assembly to be retrofit to use a verification valve 124 through the use of a modified sensor assembly 111.

Figure 4:
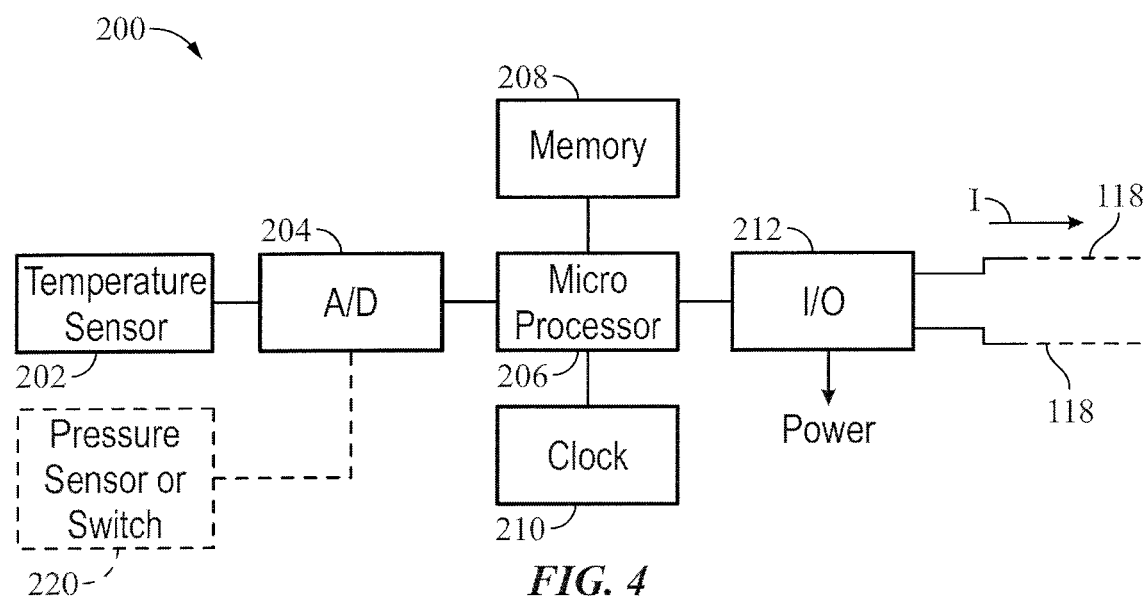
FIG. 4 is a simplified block diagram of circuitry in the process variable transmitter.

FIG. 4 is a simplified block diagram of transmitter circuitry 200 which is contained in transmitter housing 108. Circuitry 200 includes a temperature sensor 202 which is thermally coupled to the process fluid 106 through the thermowell assembly 110. The temperature sensor can be in accordance with any technology such as an RTD sensor, a thermistor, a thermocouple, a semiconductor based sensor, an infrared sensor, or some other technology. Sensor 202 is an example of a sealed sensing element and can be positioned in or proximate bore 140 of thermowell body 120. An output from the temperature sensor 202 is received by an analog to digital converter 204 which provides a digital output related to the sensed temperature to a microprocessor 206. Microprocessor 206 operates in accordance with instructions stored in a memory 208 and at a speed determined by a clock 210. Memory 208 may also be used to store variables or other parameters as desired. The microprocessor 206 provides an output to input/output circuitry 212 related to the sensed temperature. The input/output circuitry 212 provides an output on the industrial process control loop 118 related to this information. For example, an analog current level I and the controlled between 4 and 20 mA to represent the sensed temperature. As discussed above, the digital output can also be used as well as a wireless output. In one configuration, power is received from the loop 118 and used to partially or wholly power the circuitry 200.

In operation, an operator can check or verify the integrity of the primary seal provided by the wall 146 of the elongate thermowell body 120 by opening the verification valve 124 using valve stem 156. If the valve 124 is opened and process fluid flows into the inlet 152, through the valve body and out the outlet 154, the operator will know that the primary seal has been broken. The valve 124 can then be closed while the process is shut down such that the failed thermowell assembly 110 may be replaced. If no process fluid is observed, it can be assumed that the primary seal is intact and the transmitter housing 108 may be removed as desired.

In one example configuration, an optional pressure sensor or pressure switch 220 shown in FIG. 4 is provided in or otherwise fluidically coupled to the side bore 150. This can provide a signal to the transmitter electronics 200 that the primary seal has failed and used to provide a warning. Similarly, the sensor 220 could be provided at the valve output 154 and used to detect process fluid or pressure from within the elongate bore 140. In another example configuration, the inlet 152 can include an optional coating or other surface 222 shown in FIGS. 2A-2C and 3B that changes color or shape when exposed to stress due to failure of the primary seal. In such a configuration, a valve can be an optional component.

In one example configuration, an optional pressure sensor or pressure switch 220 shown in FIG. 4 is provided in or otherwise fluidically coupled to the side bore 150. This can provide a signal to the transmitter electronics 200 that the primary seal has failed and used to provide a warning. Similarly, the sensor 220 could be provided at the outlet 154 and used to detect process fluid or pressure from within the elongate bore 140. In another example configuration, the inlet 152 can include an optional coating or other surface 222 shown in FIGS. 2A-2C and 3B that changes color or shape when exposed to stress due to failure of the primary seal. In such a configuration, a valve can be an optional component.

What is claimed is:

1. A thermowell assembly for use in measuring a temperature of a process fluid, comprising:
    an elongate thermowell body configured to mount to a process vessel and extend into the process fluid contained in the process vessel;
    an elongate bore in the elongate thermowell body which extends along a length of the elongate thermowell body from a proximal end of the elongate thermowell body that is proximate to a wall of the process vessel to a sealed distal end of the elongate thermowell body positioned in the process fluid, the elongate bore configured to carry a temperature sensor which is isolated from the process fluid by the elongate thermowell body;
    a side bore in the elongate thermowell body which extends from an exterior of the thermowell body to the elongate bore, the side bore being positioned outside of the process vessel; and
    a verification valve mounted on the elongate thermowell body having an inlet coupled to the side bore at the exterior of the thermowell assembly and having an outlet whereby an operator can determine a presence of process fluid in the elongate bore by opening the verification valve and observing the process fluid at the outlet of the verification valve;

wherein the verification valve includes a visual indicator which indicates presence of a pressure within the elongate bore; and wherein the visual indicator changes shape in response to applied pressure.

2. The thermowell assembly of claim 1, wherein the side bore extends at an acute angle with respect to the elongate bore.

3. The thermowell assembly of claim 1, wherein the side bore extends in parallel with the elongate bore.

4. The thermowell assembly of claim 1, wherein the visual indicator comprises a coating on the verification valve.

5. The thermowell assembly of claim 1, wherein the visual indicator comprises a surface of the verification valve.

6. The thermowell assembly of claim 1, wherein the visual indicator alternatively changes color in response to applied pressure.

7. The thermowell assembly of claim 1, including a sensor assembly attached to the elongate thermowell body.

8. The thermowell assembly of claim 7, wherein the sensor assembly is threadably received by the elongate thermowell body.

9. The thermowell assembly of claim 7, wherein the side bore extends through the sensor assembly.

10. The thermowell assembly of claim 7, wherein the sensor assembly includes a temperature sensor which is thermally coupled to the elongate thermowell body.

11. A temperature transmitter coupled to the thermowell assembly of claim 1, the temperature transmitter including:

a temperature sensor coupled to the elongate thermowell body and configured to measure a temperature of the process fluid; and transmitter electronics configured to measure the temperature of the process fluid and provide an output related to the measured temperature.

12. The temperature transmitter of claim 11, wherein the output is provided on a process control loop.

13. The temperature transmitter of claim 11, including a sensor coupled to the side bore that is configured to sense a pressure in the side bore, the sensor configured to provide an output to the transmitter electronics.

14. A method of identifying a failed primary seal in the thermowell assembly of claim 1, comprising:

opening the verification valve; and observing the process fluid at the outlet of the verification valve.

* * * * *